Nov. 6, 1923.
H. F. DUNN
1,473,400
HEADLIGHT CONSTRUCTION
Filed Oct. 3, 1921
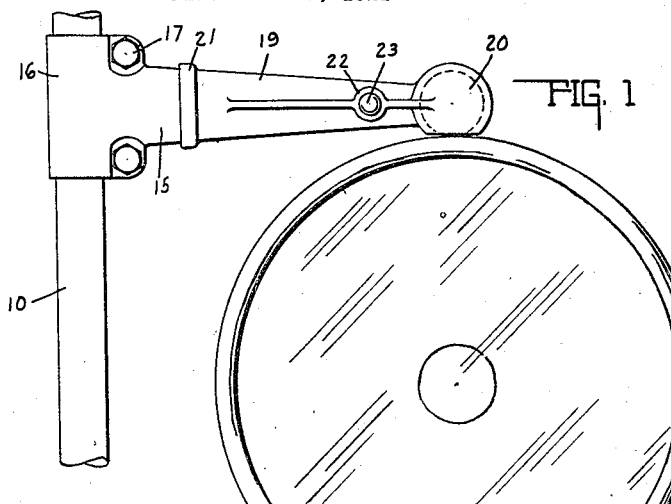
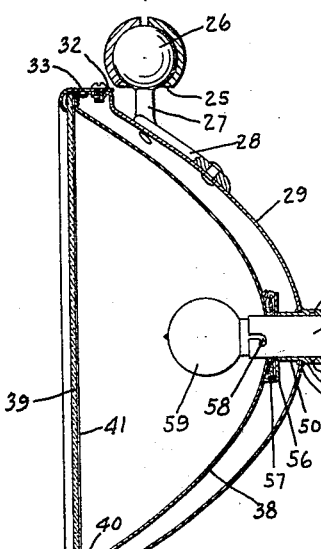
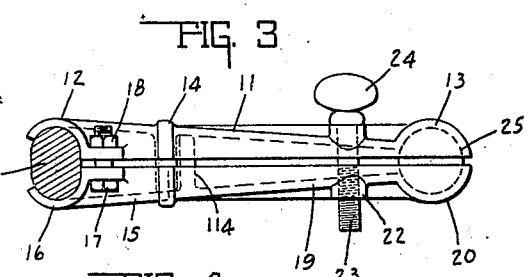
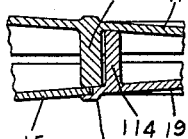
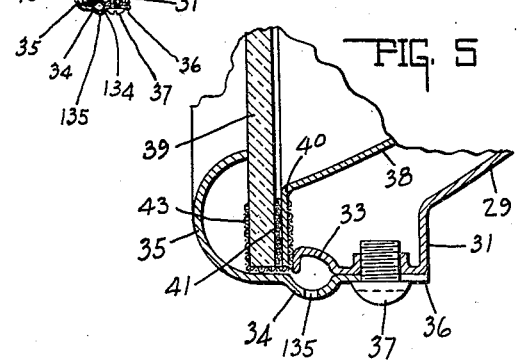
INVENTOR.
HENRY F. DUNN.
BY
*Lockwood & Lockwood*
ATTORNEYS.

Patented Nov. 6, 1923.

1,473,400

UNITED STATES PATENT OFFICE.

HENRY F. DUNN, OF INDIANAPOLIS, INDIANA, ASSIGNOR TO DUNN ACCESSORIES COMPANY, OF INDIANAPOLIS, INDIANA, A CORPORATION.

HEADLIGHT CONSTRUCTION.

Application filed October 3, 1921. Serial No. 504,860.

*To all whom it may concern:*

Be it known that I, HENRY F. DUNN, a citizen of the United States, and a resident of Indianapolis, county of Marion, and State of Indiana, have invented a certain new and useful Headlight Construction; and I do hereby declare that the following is a full, clear, and exact description thereof, reference being had to the accompanying drawings, in which like numerals refer to like parts.

This invention relates to a headlight construction and the mounting therefor, which permits the headlight to be secured in a plurality of positions, thereby serving as a spot light.

The chief object of this invention is to secure a headlight construction which is not subject to deterioration of the elements therein, with the exception of the lamp bulb, and which will permit focusing of the lamp bulb.

The chief feature of the invention consists in the particular mounting of the spot light and the details of construction of said spot light, whereby the aforesaid objects are attained.

The full nature of the invention will be understood from the accompanying drawings and the following description and claims.

In the drawings, Fig. 1 is an elevational view of a headlight and support therefor. Fig. 2 is a central cross sectional view of the same. Fig. 3 is a plan view of the headlight supporting means. Fig. 4 is a detail thereof in section. Fig. 5 is an enlarged cross sectional view of the lower portion of the lamp shown in Fig. 2.

In the drawings 10 indicates an upright or supporting standard; 11 indicates a bracket arm having a grooved portion 12 and a hemi-spherical socket seat 13 separated by an intermediate spacing boss 14. A support clamping member 15 is also provided with a groove 16 and bears at one end against the support 10, and at the other end on the boss 14. The clamping member 15 is secured to the member 11 by the bolts 17 and nuts 18, thereby rigidly securing the bracket arm 11 upon the upright support 10.

Another clamping member 19 is provided with a hemi-spherical socket seat 20 and a boss 114 and a grooved flange 21 at the opposite end, which grooved flange is seatable upon the boss 14, see Fig. 4, and is adapted to maintain the member 15 in position thereon. The clamping member 19 is provided with a threaded opening 22 and extending through the bracket arm 11 is a clamping bolt 23 having the winged head 24. The hemi-spherical sockets 13 and 20 thus are adapted to form a spherical socket, and each of the socket members is apertured to form a circular opening when in assembled relation, said opening being indicated by the dotted line 25 in Fig. 3, and by the full line 25 in Fig. 2.

A spherical ball 26 is seatable in said spherical socket, and attached to the same is a stem 27 which extends through the circular opening 25 and terminates in a bracket plate 28 secured to the lamp shell or headlight housing 29 having a central opening 30 and a circular flange 31 with a peripheral rim forming flange 32 integral therewith. The peripheral flange is also provided with an annular groove 33.

A cylindrical member or sleeve or rim 34 is provided with an inturned bead 35 and said cylindrical portion is adapted to telescope the flat peripheral flange 33, and be secured to the same by being provided with axial slots 36, said axial slots receiving a screw bolt 37 which have a threaded connection with the housing 29 and are thus adapted to rigidly secure the closure cylinder to the housing shell. It will, therefore, be apparent that moisture which might otherwise seep between the peripheral flange 33 of the shell and the cylindrical closure portion 34 will be trapped in the annular groove 33 and be conveyed to the bottom portion of the reflector, and will thereupon escape without passing into the reflector 38 or upon the inner side of the glass closure 39 through the groove 134 and hole 135.

As herein illustrated, the reflector 38 is provided with a flanged portion 40, and positioned between said flanged portion and the closure member is an annular packing member 41 which is preferably of compressible felt. The glass closure member is secured to the reflector by means of an adhesive strip 43 which provides a fluid-tight joint therebetween and prevents the admission of moisture to the interior of the reflector or the interior of the glass closure plate.

Positioned in the central aperture 30 of the housing shell 39 is a sleeve member 50 having a shoulder 51 which limits the movement of said sleeve in said aperture, and said sleeve is suitably secured to said housing. The interior of the sleeve is provided with an annular groove 52 and a draining outlet 53 communicating therewith. The usual lamp, terminal or mounting 54 is slidably supported in said sleeve and the socket finger piece 55 permits said terminal or mounting to be moved longitudinally upon the axis of the reflector. Supported upon the terminal mounting 54 and bearing against the inner end of the sleeve 50 is a metallic washer 56, and positioned between said washer and the rear portion of the reflector 38 is a felt washer or packing member 57. Thus, compressional force exerted when the cylindrical closure portion 34 is positioned upon the shell is transmitted through the closure member 39 and reflector 38 to the felt packing 57, and thereby forms a seal therebetween, as well as the seal heretofore described secured by the adhesive tape construction 43 and the felt packing construction 41. The lamp is also provided with the usual lamp bulb 59, and by means of the socket finger piece 55, the lamp bulb is movable longitudinally upon the reflector axis for focusing purposes.

The invention claimed is:

1. In a headlight construction, the combination with a support, and a headlight device, of an elongated bracket member having a support engaging groove, a hemi-spherical socket and an intermediate spacing boss, a clamping bracket having a complementary support engaging groove, and a clamping socket member having a hemi-spherical socket, said clamping bracket and said clamping socket member being seatable upon said spacing boss.

2. A headlight comprising a shell housing having an aperture and an annular rim with a groove therein, a sleeve in said aperture having a drain groove therein and provided with an outlet discharging without the shell, a lamp support seatable in said sleeve, and closure means for said shell having a discharge aperture adjacent the rim groove.

3. In a head light construction, the combination of an enclosing shell having an aperture therein, a sleeve seatable in said aperture for supporting a lamp bulb, a washer adjacent said sleeve, a reflector supported upon said sleeve, and packing means interposed between said washer and said reflector.

4. In a headlight construction, the combination of an enclosing shell having an aperture therein, a sleeve seatable in said aperture for supporting a lamp bulb, a washer adjacent said sleeve, a reflector supported upon said sleeve, packing means interposed between said washer and said reflector, a closure member for said reflector, and seal means for sealing the closure member and reflector together.

5. In a headlight construction, the combination of an enclosing shell having an aperture therein, a sleeve seatable in said aperture for supporting a lamp bulb, a washer adjacent said sleeve, a reflector supported upon said sleeve, packing means interposed between said washer and said reflector, a closure member, and intermediate compressible means between said closure member and said reflector.

6. In a head light construction, the combination of an enclosing shell having an aperture therein, a sleeve seatable in said aperture for supporting a lamp bulb, a washer adjacent said sleeve, a reflector supported upon said sleeve, packing means interposed between said washer and said reflector, a closure member, intermediate compressible means between said closure member and said reflector, and seal means for sealing the closure member and reflector together.

In witness whereof, I have hereunto affixed my signature.

HENRY F. DUNN.